(12) United States Patent
Niwa et al.

(10) Patent No.: US 7,963,363 B2
(45) Date of Patent: Jun. 21, 2011

(54) SOUNDPROOF COVER FOR AUTOMOBILES

(75) Inventors: Takahiro Niwa, Tokyo (JP); Motonori Kondoh, Tokyo (JP); Tadashi Mori, Tokyo (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 12/537,502

(22) Filed: Aug. 7, 2009

(65) Prior Publication Data

US 2010/0032234 A1 Feb. 11, 2010

(30) Foreign Application Priority Data

Aug. 8, 2008 (JP) ................ P.2008-205739
Aug. 3, 2009 (JP) ................ P.2009-180656

(51) Int. Cl.
*E04B 1/82* (2006.01)
*F02B 77/13* (2006.01)
*G10K 11/04* (2006.01)
*H05K 5/00* (2006.01)

(52) U.S. Cl. ........ 181/290; 181/151; 181/200; 181/204; 181/286

(58) Field of Classification Search .......... 181/290, 181/286, 204, 200, 151
See application file for complete search history.

(56) References Cited

U.S. PATENT DOCUMENTS

| | | | | | |
|---|---|---|---|---|---|
| 3,269,484 | A | * | 8/1966 | Lighter | 181/290 |
| 4,242,398 | A | * | 12/1980 | Segawa et al. | 428/172 |
| 4,867,271 | A | * | 9/1989 | Tschudin-Mahrer | 181/290 |
| 5,298,694 | A | * | 3/1994 | Thompson et al. | 181/286 |
| 5,410,111 | A | * | 4/1995 | Stief et al. | 181/286 |
| 5,589,242 | A | * | 12/1996 | Stief et al. | 428/45 |
| 5,652,415 | A | * | 7/1997 | Pelzer et al. | 181/286 |
| 5,971,099 | A | * | 10/1999 | Yasuda et al. | 181/286 |
| 6,382,350 | B1 | * | 5/2002 | Jezewski et al. | 181/290 |
| 6,595,321 | B1 | * | 7/2003 | Tompson | 181/290 |
| 6,805,219 | B2 | * | 10/2004 | Yasuda et al. | 181/204 |
| 7,402,537 | B1 | * | 7/2008 | Lenda et al. | 442/50 |
| 7,591,346 | B2 | * | 9/2009 | Thompson et al. | 181/291 |
| 2003/0010566 | A1 | * | 1/2003 | Miyakawa et al. | 181/204 |
| 2004/0007421 | A1 | * | 1/2004 | Ueno et al. | 181/204 |
| 2006/0065474 | A1 | * | 3/2006 | Niwa et al. | 181/151 |
| 2006/0169531 | A1 | * | 8/2006 | Volker | 181/204 |
| 2008/0236936 | A1 | * | 10/2008 | Niwa et al. | 181/200 |

FOREIGN PATENT DOCUMENTS

| | | |
|---|---|---|
| DE | 102004007602 A1 | 9/2005 |
| DE | 10 2008 022 652 | 11/2009 |
| EP | 1 847 419 A1 | 10/2007 |

(Continued)

OTHER PUBLICATIONS

Search Report in GB 0913678.9 dated Dec. 9, 2009.

*Primary Examiner* — Jeffrey Donels
*Assistant Examiner* — Christina Russell
(74) *Attorney, Agent, or Firm* — Nixon & Vanderhye P.C.

(57) ABSTRACT

The present invention relates to a soundproof cover for automobiles, the soundproof cover including: a cover body formed of a metal or a resin; and a sound-absorbing material disposed opposite to a sound source, in which the sound-absorbing material has a soft sound-insulating layer on a surface side thereof facing the cover body, the sound-absorbing material is disposed apart from the cover body, and the sound-absorbing material has a peripheral edge that contacts with an inner wall of an edge of the cover body.

9 Claims, 8 Drawing Sheets

FOREIGN PATENT DOCUMENTS

| | | |
|---|---|---|
| FR | 2 810 937 | 6/2000 |
| JP | 59-3117 | 1/1984 |
| JP | 9-151788 | 6/1997 |
| JP | 2006-98966 | 4/2006 |
| JP | 2006-098966 | 4/2006 |
| JP | 2007-255189 | 10/2007 |

* cited by examiner

SOUNDPROOF COVER FOR AUTOMOBILES

FIELD OF THE INVENTION

The present invention relates to a soundproof cover for automobiles (hereinafter this may be simply referred to as "soundproof cover") to be fitted to automobile engines, transmissions, driving systems and the like.

BACKGROUND OF THE INVENTION

There are a large number of sound sources in an automobile. From the viewpoint of the demand for quietness from the noise inside and outside a car, various soundproof measures have been taken. In particular, with regard to the components (noise emitting sources) that generate loud sounds, such as engines, transmissions and driving systems, soundproof measures are required in the positions near to the sound sources. Thus, a dedicated soundproof component called a soundproof cover is used.

As conventional soundproof covers, highly rigid covers formed by molding a metal or a resin such as polyamide, polypropylene are used, as planned with putting the principal objective thereof to insulation of the direct noises from the noise emitting sources. Therefore, the covers are so designed that a sound-absorbing material is post-attached to the side of the soundproof cover or a part thereof facing a noise emitting source.

Regarding the evaluation of noises inside and outside an automobile, since the noise level itself is an amount of sense of human, a sound pressure level (dB) obtained by logarithmically compressing an observed sound pressure is used as an evaluation criterion close to an amount of the sound sensed by human. However, when a four (multi)-directional average (combination sound) which is generally employed in a case of evaluating a general soundproofing effect (in point of the increase or decrease in sound pressure level) is calculated, the sound pressure level is affected by the largest sound of all the measured sounds because of the characteristic of the dB sum calculation. Therefore, even though the sound pressure level in only one direction in which a soundproof measure has been taken is reduced, the effect could not be attained as a whole with the result that the sound pressure level as the level of human sense to sound could not be lowered in some cases. Accordingly, it is necessary to thoroughly and uniformly reduce the sound pressure level in every direction.

However, in the above-mentioned soundproof cover constructed by attaching a sound-absorbing material to a rigid cover, the rigid cover may be resonant to vibration transmission (solid-borne sounds) in case where the noise emitting sources vibrate, thereby generating noises by itself to be a new noise emitting source (secondary emission). In general, therefore, the soundproof cover must be fixed to the noise emitting sources via a vibration-insulating material such as rubber bush. Necessarily, therefore there occurs a gap between the peripheral edge of the soundproof cover and the noise emitting source, and inner reverberating sounds (standing waves) leak out from the gap with the result that the sound level reduction could not be attained in some cases.

Accordingly, the present applicant has previously proposed a soundproof cover in which a soft sound-insulating layer formed of a nonwoven fabric coated with a damping resin is provided on the side of the sound-absorbing material opposite to the side thereof to face a noise emitting source, in place of a rigid cover (see Patent Document 1). In this soundproof cover, the noise from a noise emitting source (airborne sounds and solid-borne sounds) runs through the inside of the sound-absorbing material and vibrates the soft sound-insulating layer of the outermost layer for sound emission (secondary emission). As a result, the noise disperses as vibration energy, thereby enhancing the soundproofing performance of the cover.

Patent Document 1 JP-A 2006-98966

SUMMARY OF THE INVENTION

With the recent tendency toward compact cars, the demand for quietness is increasing more and more, and the soundproof cover described in Patent Document 1 could not satisfy it.

Thus, an object of the invention is to provide a lightweight soundproof cover for automobiles having an excellent sound-insulating performance and capable of blocking or reducing the transmissive vibration in a frequency region over resonance frequency, not having any negative influence on standing waves.

Namely, the present invention relates to the following items (1) to (5).

(1) A soundproof cover for automobiles, the soundproof cover comprising:
a cover body formed of a metal or a resin; and
a sound-absorbing material disposed opposite to a sound source,
wherein the sound-absorbing material has a soft sound-insulating layer on a surface side thereof facing the cover body,
the sound-absorbing material is disposed apart from the cover body, and
the sound-absorbing material has a peripheral edge that contacts with an inner wall of an edge of the cover body.

(2) A soundproof cover for automobiles, the soundproof cover comprising:
a cover body formed of a metal or a resin; and
a sound-absorbing material disposed opposite to a sound source,
wherein the sound-absorbing material has a soft sound-insulating layer on a surface side thereof facing the cover body,
the sound-absorbing material is disposed apart from the cover body, and
a clearance between a peripheral edge of the sound-absorbing material and an inner wall of an edge of the cover body is sealed up with a sealing material comprising an elastic material.

(3) The soundproof cover according to (1) or (2), wherein a gap between the cover body and the soft sound-insulating layer is filled with an air-permeable sound-absorbing material having a density of 100 kg/m$^3$ or less.

(4) The soundproof cover according to any one of (1) to (3), wherein the soft sound-insulating layer comprises a nonwoven fabric, a cloth, a laminate film, a rubber sheet, a resin film, a damping resin, a damping rubber or a laminate thereof.

(5) The soundproof cover according to (4), wherein the soft sound-insulating layer comprises the nonwoven fabric or the cloth, coated with the damping resin.

As described above, the soundproof cover for automobiles of the present invention has a structure in which an air layer is confined between the cover body being rigid and the soft sound-insulating layer attached to the surface of sound-absorbing material. Therefore, the soundproof cover of the invention has functions that the vibration attributed to the noise emitting source is absorbed by the soft sound-insulating layer and is further reduced by the air layer, in addition to the soundproof effect of the sound-absorbing material. Accordingly, according to the present invention, the soundproof cover having a more excellent soundproof performance than conventionally can be provided.

DESCRIPTION OF REFERENCE NUMERALS

1 Cover Body
2 Projection
3 Gap or Air-Permeable Sound-Absorbing Material
4 Sound-Absorbing Material
4a Peripheral Edge of Sound-Absorbing Material
5 Resin Fastener
6 Soft Sound-Insulating Layer
7 Sealing Material

DETAILED DESCRIPTION OF THE INVENTION

The invention is described in detail hereinafter with reference to the drawings attached hereto.

Figure 1:
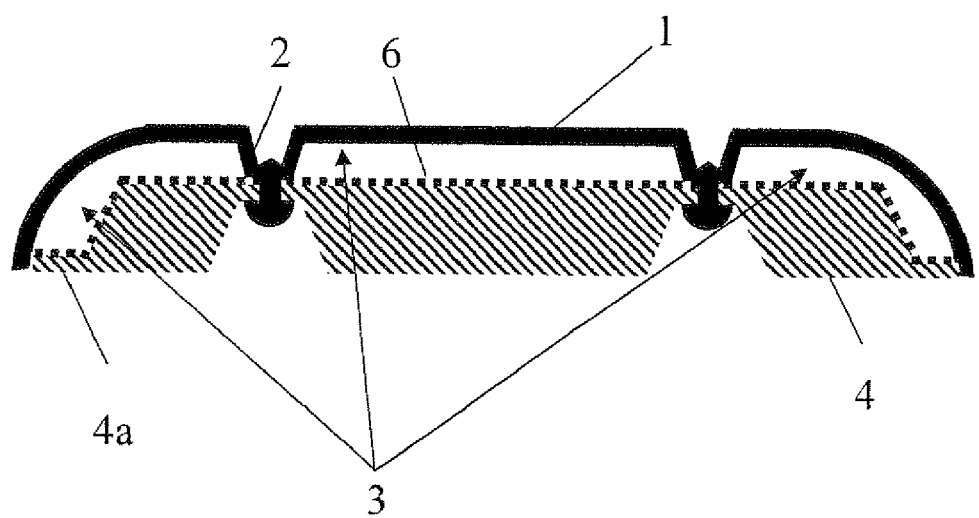
FIG. 1 is a cross-sectional view graphically showing one example of the soundproof cover for automobiles of the invention.

FIG. 1 is a cross-sectional view showing one example of the soundproof cover for automobiles of the invention. As illustrated, on the side of the cover body 1 facing a noise emitting source such as engine (not shown, lower side on the paper), a sound-absorbing material 4 having a soft sound-insulating layer 6 attached thereto on the side thereof facing the cover body is disposed, as spaced by a predetermined gap 3 given therebetween. Furthermore, the peripheral edge 4a of the sound-absorbing material 4 contacts with the inner surface of the edge of the cover body 1 to thereby seal up the clearance between the cover body 1 and the sound-absorbing material 4.

The peripheral edge 4a of the sound-absorbing material 4 may be reduced the thickness thereof by press-molding or the like, as illustrated; however, not molded thin, the edge may have the original thickness of the sound-absorbing material 4 as such.

Figure 2:
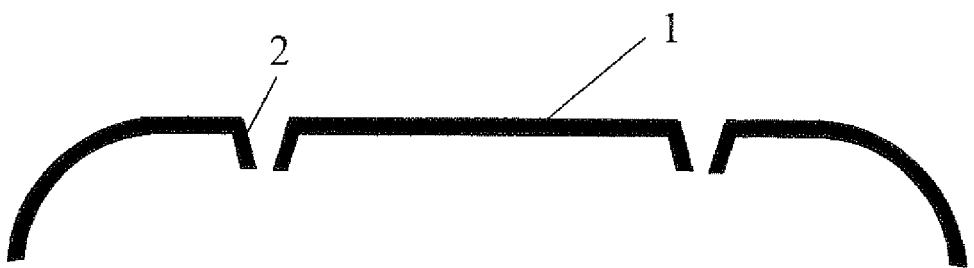
FIG. 2 is a view showing the cover body of the soundproof cover for automobiles of FIG. 1.

The cover body 1 is formed of a metal or a resin, and as shown in FIG. 2, the periphery thereof is curved toward a noise emitting source to be adjacent thereto, and conical projections 2 are suitably provided on the cover body 1. Preferable examples of the metal include stainless steel. Preferable examples of the resin include polypropylene resins, polyamide resins such as nylon 6, nylon 66, nylon 11, nylon 12, nylon 610 and nylon 612, acrylic resins, fluororesins such as polyvinylidene fluoride resins and polytetrafluoroethylene resins, polyester resins such as polyethylene terephthalate, diallyl phthalate resins, bismaleimide-triazine resins, phenolic resins, urea resins, melamine resins, epoxy resins, polystyrene resins, ABS resins, polyvinyl chloride resins, methacrylic resins, polyamidimide resins, polyisobutylene resins, polycarbonate resins, polyphenylene oxide resins, polyphenylene sulfide resins, polyacetal resins and polyether sulfone resins. In view of lightweight, easily moldable and inexpensive, the cover body 1 is preferably formed of a resin. Additionally, the cover body 1 preferably has high rigidity (namely, hard cover body). Specifically, the flexural strength according to JIS K 7171 of the cover body 1 is 100 MPa or more, preferably 100 to 300 MPa.

Examples of the sound-absorbing material 4 include glass wool, rock wool, rock wool long fibers (Chubu Industry's Basalt Fiber®, etc.), polyurethane foam, polyethylene foam, polypropylene foam, phenolic foam, melamine foam, open cellular foam rubbers such as nitrile-butadiene rubber, chloroprene rubber, styrene rubber, silicone rubber, urethane rubber and EPDM, open cellular foams produced by foaming them followed by crushing them to make them have open foam cells therein, polyester fiber felts such as polyethylene terephthalate fiber felts, nylon fiber felts, polyethylene fiber felts, polypropylene fiber felts, acrylic fiber felts, silica-alumina ceramic fiber felts, silica fiber felts (Nichias's Siltex®, etc.), felts formed of cotton, wool, wood, waste fibers, etc. For the purpose of preventing the fibers and others from scattering and of improving the outward appearance of products, thermoplastic resin long fibers, such as polyethylene long fibers, polypropylene long fibers, nylon long fibers, Tetron long fibers, acrylic long fibers, rayon long fibers, vinylon long fibers, fluororesin long fibers such as polyvinylidene fluoride long fibers and polytetrafluoroethylene long fibers, polyester long fibers such as polyethylene terephthalate, or two-layered long fibers of polyester long fibers coated with polyethylene resin, either singly or as combined into conjugated fibers, may be shaped into thin sheets according to a spun-bonding method, and the resulting thin and flexible nonwoven fabric sheet having a basis weight of 15 to 150 g/m² may be stuck to the side of the cover facing a noise emitting source such as engine.

Examples of the soft sound-insulating layer 6 include a nonwoven fabric, a cloth, a laminate film, a rubber sheet, a resin film, a damping resin, a damping rubber, and they may be used alone or a in combination thereof as a laminate. For example, as such a laminate, a nonwoven fabric coated with the damping resin, a cloth coated with the damping resin or the like may be used. Specifically, as the soft sound-insulating layer 6, the materials having an air permeability of 0.001 to 10 cc/cm²×sec, preferably 0.01 to 1 cc/cm²×sec as described in the following items A to H may be used. Incidentally, such an air permeability can be measured according to JIS L 1018.

A. Thermoplastic resin long fibers, such as polyethylene long fibers, polypropylene long fibers, nylon long fibers, Tetron long fibers, acrylic long fibers, rayon long fibers, vinylon long fibers, fluororesin long fibers such as polyvinylidene fluoride long fibers and polytetrafluoroethylene long fibers, polyester long fibers such as polyethylene terephthalate, and two-layered long fibers of polyester long fibers coated with polyethylene resin, either singly or as combined into conjugated fibers, are shaped into thin sheet according to a spun-bonding method, and the resulting thin and flexible nonwoven fabric sheet having a basis weight of 15 to 150 g/m$^2$ is coated, on one or both surfaces thereof, with a resin or a rubber having a loss tangent peak within a temperature range of room temperature (20° C.) to 150° C. and having a damping property, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber and fluorosilicone rubber, by spraying or roller coating, thereby forming a damping resin film or a damping rubber film selectively on the surface of the nonwoven fabric, and thereby making the thus-coated nonwoven fabric having an air permeability of 0.001 to 10 cc/cm$^2$×sec, preferably 0.01 to 1 cc/cm$^2$×sec.

B. Thermoplastic resin short fibers, such as polyethylene short fibers, polypropylene short fibers, nylon short fibers, Tetron short fibers, acrylic short fibers, rayon short fibers, vinylon short fibers, fluororesin short fibers such as polyvinylidene fluoride short fibers and polytetrafluoroethylene short fibers, polyester short fibers such as polyethylene terephthalate, two-layered short fibers of polyester short fibers coated with polyethylene resin, and short fibers formed of natural materials such as wool, cotton, wood, kenaf fibers, either singly or as combined into conjugated fibers, are shaped into thin sheet according to a chemical bonding method, a thermal bonding method, a stitch-bonding method, a needle-punching method or the like, and the resulting thin and flexible nonwoven fabric sheet having a thickness of 0.5 to 5 mm or so and having a basis weight of 50 to 600 g/m$^2$ is coated, on one or both surfaces thereof, with a resin or a rubber having a loss tangent peak within a temperature range of room temperature (20° C.) to 150° C. and having a damping property, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber and fluorosilicone rubber, by spraying or roller coating, thereby forming a damping resin film or a damping rubber film selectively on the surface of the nonwoven fabric, and thereby making the thus-coated nonwoven fabric having an air permeability of 0.001 to 10 cc/cm$^2$×sec, preferably 0.01 to 1 cc/cm$^2$×sec.

C. Glass fibers, rock wool fibers, rock wool long fibers (Chubu Industry's Basalt Fiber®, etc.), silica fibers (Nichias's Siltex®, etc.), silica-alumina ceramic fibers, alumina fibers, whiskers such as silicon carbide whiskers or the like, either singly or as combined into conjugated products, are shaped into flexible nonwoven fabric having a thickness of 0.5 to 5 mm or so according to a chemical bonding method, and the resulting nonwoven fabric is coated, on one or both surfaces thereof, with a resin or a rubber having a loss tangent peak within a temperature range of room temperature (20° C.) to 150° C. and having a damping property, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber and fluorosilicone rubber, by spraying or roller coating, thereby forming a damping resin film or a damping rubber film selectively on the surface of the nonwoven fabric, and thereby making the thus-coated nonwoven fabric having an air permeability of 0.001 to 10 cc/cm$^2$×sec, preferably 0.01 to 1 cc/cm$^2$×sec.

D. The thin and flexible nonwoven fabric sheet having a basis weight of 15 to 150 g/m$^2$ as described in the above A, or the flexible nonwoven fabric having a thickness of 0.5 to 5 mm or so as described in the above C is laminated with the thin and flexible nonwoven fabric sheet having a thickness of 0.5 to 5 mm or so and having a basis weight of 50 to 600 g/m$^2$ as described in the above B, and then the resulting laminate is coated, on one or both surfaces thereof, with a resin or a rubber having a loss tangent peak within a temperature range of room temperature (20° C.) to 150° C. and having a damping property, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber and fluorosilicone rubber, by spraying or roller coating, thereby forming a damping resin film or a damping rubber film selectively on the surface of the nonwoven fabric laminate, and thereby making the thus-coated nonwoven fabric laminate have an air permeability of 0.001 to 10 cc/cm$^2$×sec, preferably 0.01 to 1 cc/cm$^2$×sec.

E. Thermoplastic resin long fibers, such as polyethylene long fibers, polypropylene long fibers, nylon long fibers, Tetron long fibers, acrylic long fibers, rayon long fibers, vinylon long fibers, fluororesin long fibers such as polyvinylidene fluoride long fibers and polytetrafluoroethylene long fibers, polyester long fibers such as polyethylene terephthalate and two-layered long fibers of polyester long fibers coated with polyethylene resin, or thermosetting resin long fibers such as phenolic resin fibers (Nippon Kynol's "Kynol", etc.), either singly or as combined into conjugated fibers, are woven according to a plane weaving method or a twill-weaving method into thin and flexible cloth, and the resulting cloth is coated, on one or both surfaces thereof, with a resin or a rubber having a loss tangent peak within a temperature range of room temperature (20° C.) to 150° C. and having a damping property, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber and fluorosilicone rubber, by spraying or roller coating, thereby forming a damping resin film or a damping rubber film selectively on the surface of the cloth, and thereby making the thus-coated cloth have an air permeability of 0.001 to 10 cc/cm$^2$×sec, preferably 0.01 to 1 cc/cm$^2$×sec.

F. Glass long fibers, rock wool long fibers (Chubu Industry's Basalt Fiber®, etc.), silica fibers (Nichias's Siltex®, etc.), silica-alumina ceramic fibers, alumina fibers or the like, either singly or as combined into conjugated fibers, are woven according to a plane weaving method or a twill-weaving method into thin and flexible cloth, and the resulting cloth is coated, on one or both surfaces thereof, with a resin or a rubber having a loss tangent peak within a temperature range of room temperature (20° C.) to 150° C. and having a damping property, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrile rubber, fluororubber, acrylic rubber, silicone rubber, ethylene-propylene rubber and fluorosilicone rubber, by spraying or roller coating, thereby forming a damping resin film or a damping rubber film selectively on the surface of the cloth, and thereby making the thus-coated cloth have an air permeability of 0.001 to 10 cc/cm²×sec, preferably 0.01 to 1 cc/cm²×sec.

G. An organic long fiber such as thermoplastic resin long fibers such as polyethylene long fibers, polypropylene long fibers, nylon long fibers, Tetron long fibers, acrylic long fibers, rayon long fibers, vinylon long fibers, fluororesin long fibers such as polyvinylidene fluoride long fibers and polytetrafluoroethylene long fibers, polyester long fibers such as polyethylene terephthalate and two-layered long fibers of polyester long fibers coated with polyethylene resin, and thermosetting resin long fibers such as phenolic resin fibers (Nippon Kynol's Kynol®, etc.) as described in the above E; and an inorganic long fiber such as glass long fibers, rock wool long fibers (Chubu Industry's Basalt Fiber®, etc.), silica fibers (Nichias's Siltex®, etc.), silica-alumina ceramic fibers and alumina fibers, as described in the above F, are combined into conjugated fibers, the resulting fibers are woven according to a plane weaving method or a twill-weaving method into thin and flexible cloth, and the resulting cloth is coated, on one or both surfaces thereof, with a resin or a rubber having a loss tangent peak within a temperature range of room temperature (20° C.) to 150° C. and having a damping property, such as polyvinyl acetate resin emulsion, polyvinyl acetate-ethylene copolymer resin emulsion, moisture-curable urethane resin, ABS resin, polyvinyl chloride resin, acrylic resin, natural rubber, isoprene rubber, butyl rubber, styrene rubber, chloroprene rubber, nitrite rubber, fluororubber, acrylic rubber, silicone rubber, ethylene-propylene rubber and fluorosilicone rubber, by spraying or roller coating, thereby forming a damping resin film or a damping rubber film selectively on the surface of the cloth, and thereby making the thus-coated cloth have an air permeability of 0.001 to 10 cc/cm²×sec, preferably 0.01 to 1 cc/cm²×sec.

H. Resins such as polyethylene resins, polypropylene resins, polyamide resins such as nylon 6, nylon 66, nylon 11, nylon 12, nylon 610, and nylon 612, acrylic resins, rayon resins, vinylon resins, fluororesins such as polyvinylidene fluoride resins and polytetrafluoroethylene resins, polyester resins such as polyethylene terephthalate, furan resins, diallyl phthalate resins, bismaleimide-triazine resins, phenolic resins, urea resins, melamine resins, alkyd resins, epoxy resins, cellulose resins, polyurethane resins, ethylene-vinyl acetate copolymer resins, chloropolyethylene resins, polystyrene resins, ABS resins, polyvinyl chloride resins, polyvinylidene chloride resins, methacrylic resins, polyamidimide resins, polyisobutylene resins, polycarbonate resins, polyvinyl acetate resins, polymethylpentene resins, polyphenylene oxide resins, polyphenylene sulfide resins, polyacetal resins, polyether sulfone resins; or rubbers such as natural rubber, isoprene rubber, butyl rubber, styrene rubber, chloroprene rubber, nitrile rubber, fluororubber, acrylic rubber, silicone rubber, ethylenepropylene rubber and fluorosilicone rubber is shaped into thin and flexible film having a thickness of 5 to 100 µm, preferably 10 to 50 µm and an air permeability of 0.001 to 10 cc/cm²×sec, preferably 0.01 to 1 cc/cm²×sec; or a film formed as the above and having a thickness of 100 to 500 µm is processed by monoaxial or biaxial shearing to form periodical slits therein, or is processed by needle-punching to form holes therein, thereby making the thus-processed film which is flexible and have an air permeability of 0.001 to 10 cc/cm²×sec, preferably 0.01 to 1 cc/cm²×sec.

Figure 3:
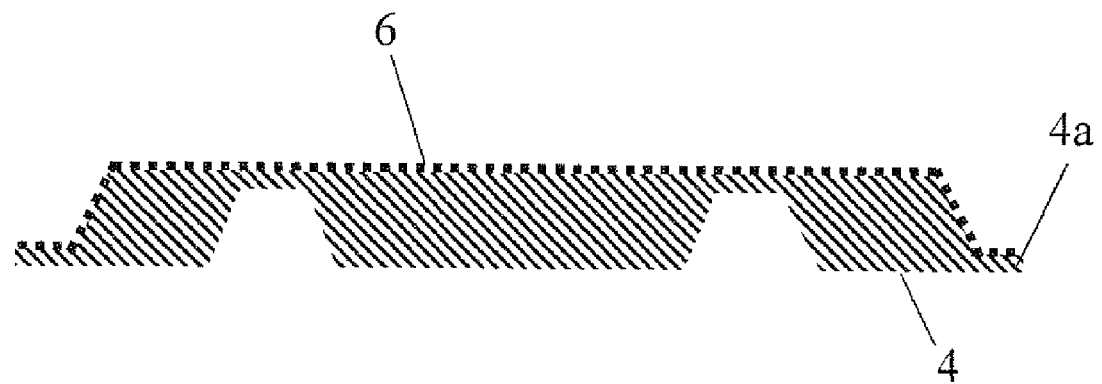
FIG. 3 is a view showing the sound-absorbing material of the soundproof cover for automobiles of FIG. 1.
Figure 4:
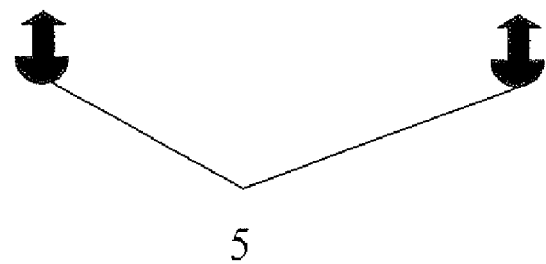
FIG. 4 is a resin fastener for the soundproof cover for automobiles of FIG. 1.

The sound-absorbing material 4 has, as in FIG. 3, recesses in the sites corresponding to the projections 2 of the cover body 2; and a resin fastener 5 shown in FIG. 4 is pierced through the recess to thereby make the sound-absorbing material 4 fastened to the projection 2 of the cover body 1. Thus, the sound-absorbing material 4 is integrated with the cover body 1 via the gap 3 formed therebetween, as in FIG. 1. The resin fastener 5 is formed by injection molding of polypropylene resin, polyamide resin such as nylon 6, nylon 66, nylon 11, nylon 12, nylon 610 and nylon 612, acrylic resin, fluororesin such as polyvinylidene fluoride resin and polytetrafluoroethylene resin, polyester resin such as polyethylene terephthalate, diallyl phthalate resin, bismaleimide-triazine resin, phenolic resin, urea resin, melamine resin, epoxy resin, polystyrene resin, ABS resin, polyvinyl chloride resin, methacrylic resin, polyamidimide resin, polyisobutylene resin, polycarbonate resin, polyphenylene oxide resin, polyphenylene sulfide resin, polyacetal resin, polyether sulfone resin, or the like.

Figure 5:
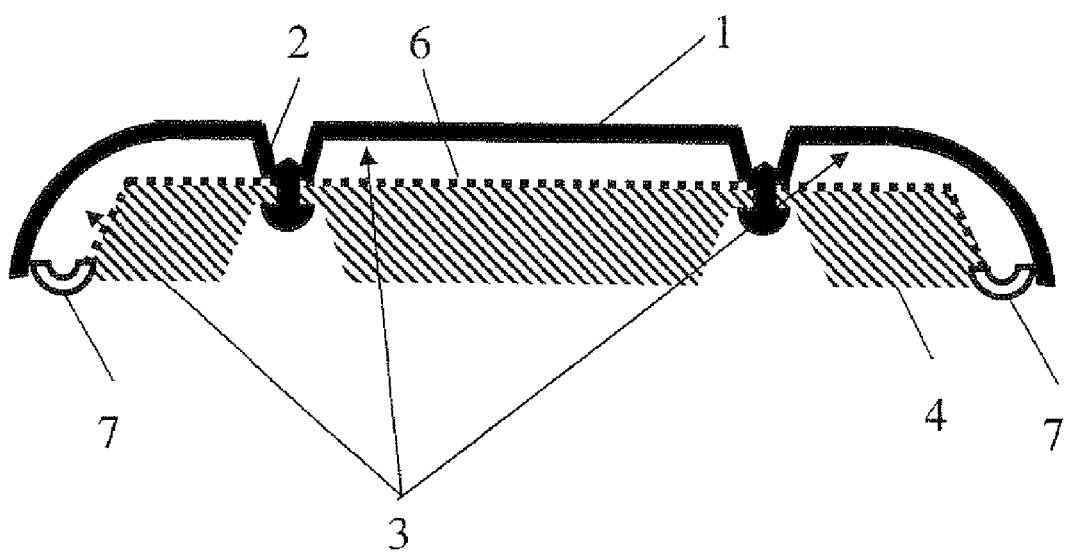
FIG. 5 is a cross-sectional view graphically showing other example of the soundproof cover for automobiles of the invention.

Additionally, in the soundproof cover for automobiles of the invention, as shown in FIG. 5, the clearance between the edge of the sound-absorbing material 4 and the inner wall of the edge of the cover body 1 may be sealed up with a sealing material 7 composed of elastic materials, instead of sealing up the clearance between the sound-absorbing material 4 and the inner wall of the edge of the cover body 1 by the peripheral edge 4a of the sound-absorbing material 4. For example, the sealing material 7 may be a ring-shaped material having a cross-sectional view of arc, and it is fitted in such a way that the inner periphery side of the sealing material 7 contacts with the peripheral edge of the soft sound-insulating layer attached to the sound-absorbing material 4, and the outer side of the sealing material 7 contacts with the inner wall of the edge of the cover body 1.

An elastic material which forms the sealing material 7 is not particularly limited so long as it is capable of sealing up the clearance between the edge of the sound-absorbing material 4 and the inner wall of the edge of the cover body 1. For example, elastic materials having a loss tangent peak within a temperature range of room temperature (20° C.) to 150° C., such as elastomers such as acrylic rubber, natural rubber, nitrile-butadiene rubber (NBR), styrene-butadiene rubber (SBR), ethylene-propylene-diene rubber (EPDM), chloroprene rubber, silicone rubber, isoprene rubber and fluororubber, and thermoplastic elastomers such as polypropylene-EPDM blend polymer (TPO), polystyrene-polybutadiene copolymer (SBC) and polyetherurethane-polyesterurethane (TPU); or flexible hot-melt films formed from resins having low molecular weight, such as polyamide 12 resin, polyurethane resin, polyester resin and polyethylene-vinyl acetate resin, may be used as elastic materials for the sealing material 7.

In the soundproof cover for automobiles of the invention, the gap 3 between the cover body 1 and the sound-absorbing material 4 may be filled with an air-permeable sound-absorbing material, apart from the above-mentioned constitution. Examples of the air-permeable sound-absorbing material include glass wool, rock wool, rock wool long fibers (Chubu Industry's Basalt Fiber®, etc.), polyurethane foam, polyethylene foam, polypropylene foam, phenolic foam, melamine foam, open cellular foam rubbers such as nitrile-butadiene rubber, chloroprene rubber, styrene rubber, silicone rubber, urethane rubber and EPDM, open cellular foams produced by foaming them followed by crushing them to make them have open foam cells therein, polyester fiber felts such as polyethylene terephthalate fiber felts, nylon fiber felts, polyethylene fiber felts, polypropylene fiber felts, acrylic fiber felts, silica-alumina ceramic fiber felts, silica fiber felts (Nichias's Siltex®, etc.) and felts formed of cotton, wool, wood, waste fibers. Preferably, the air-permeable sound-absorbing material has a density of at most 100 kg/m$^3$. Those having a density of more than 100 kg/m$^3$ may be ineffective for sound insulation.

EXAMPLES

Example 1

A cover body of 6,6-nylon having a thickness of 3 mm, having a flexural strength of 113 MPa and having a curved peripheral edge as in FIG. 2 was prepared. A soft sound-insulating layer was prepared by coating a nonwoven fabric having a basis weight of 500 g/m$^2$ and an air permeability of 0.5 cc/cm$^2$×sec, with a moisture-curable urethane resin (Nitta Gelatin's ARX-1272A®). Incidentally, the above-mentioned nonwoven fabric was a flexible nonwoven fabric prepared by laminating a thin sheet having a basis weight of 40 g/m$^2$ and was obtained by shaping a polyethylene long fiber according to spun-bonding method; with a thin sheet having a basis weight of 180 g/m$^2$ and was obtained by shaping a polyethylene terephthalate short fiber according to a chemical bonding method, according to needle-punching method. Then, the soft sound-insulating layer was provided on one surface of a PET felt having a basis weight of 500 g/m$^2$ and a thickness of 10 mm, thereby preparing a sound-absorbing material. The cover body and the sound-absorbing material were integrated together, as spaced from each other via a gap of 10 mm therebetween, in such a manner that the soft sound-insulating layer could face the cover body; and the gap between the cover body and the sound-absorbing material was filled with a PET felt having a basis weight of 500 g/m$^2$ and a thickness of 10 mm, thereby constructing a soundproof cover. Incidentally, the sound-absorbing material was hot-pressed to reduce the thickness of peripheral edge thereof, as in FIG. 3, and this was made to contact with the inner wall of the cover body at the edge thereof (see FIG. 1).

Example 2

A cover body of 6,6-nylon having a thickness of 3 mm, having a flexural strength of 113 MPa and having a curved peripheral edge as in FIG. 2 was prepared. A soft sound-insulating layer was prepared by coating a nonwoven fabric having a basis weight of 500 g/m$^2$ with a moisture-curable urethane resin (Nitta Gelatin's ARX-1272A®). Incidentally, as the nonwoven fabric, the same nonwoven fabric as used in Example 1 was used. Then, the soft sound-insulating layer was provided on one surface of a PET felt having a basis weight of 500 g/m$^2$ and a thickness of 10 mm, thereby preparing a sound-absorbing material. The cover body and the sound-absorbing material were integrated together, as spaced from each other via a gap of 10 mm therebetween, in such a manner that the soft sound-insulating layer could face the cover body, thereby constructing a soundproof cover. Incidentally, the sound-absorbing material was hot-pressed to reduce the thickness of peripheral edge thereof, as in FIG. 3, and this was made to contact with the inner wall of the cover body at the edge thereof (see FIG. 1).

Comparative Example 1

A cover body of 6,6-nylon having a thickness of 3 mm, having a flexural strength of 113 MPa and having a curved peripheral edge as shown in FIG. 2 was prepared, to which a PET felt having a basis weight of 1000 g/m$^2$ and having a thickness of 20 mm was attached, thereby constructing a soundproof cover.

Comparative Example 2

A cover body of 6,6-nylon having a thickness of 3 mm, having a flexural strength of 113 MPa and having a curved peripheral edge as shown in FIG. 2 was prepared. A soft sound-insulating layer was prepared by coating a nonwoven fabric having a basis weight of 500 g/m$^2$ with a moisture-curable urethane resin (Nitta Gelatin's ARX-1272A®). Incidentally, as the nonwoven fabric, the same nonwoven fabric as used in Example 1 was used. Then, the soft sound-insulating layer was provided on one surface of a PET felt having a basis weight of 1000 g/m$^2$ and a thickness of 20 mm, thereby preparing a sound-absorbing material. The sound-absorbing material was attached to the cover body in such a manner that the soft sound-insulating layer could face the cover body, thereby constructing a soundproof cover.

Evaluation of Soundproof Performance

Figure 6:
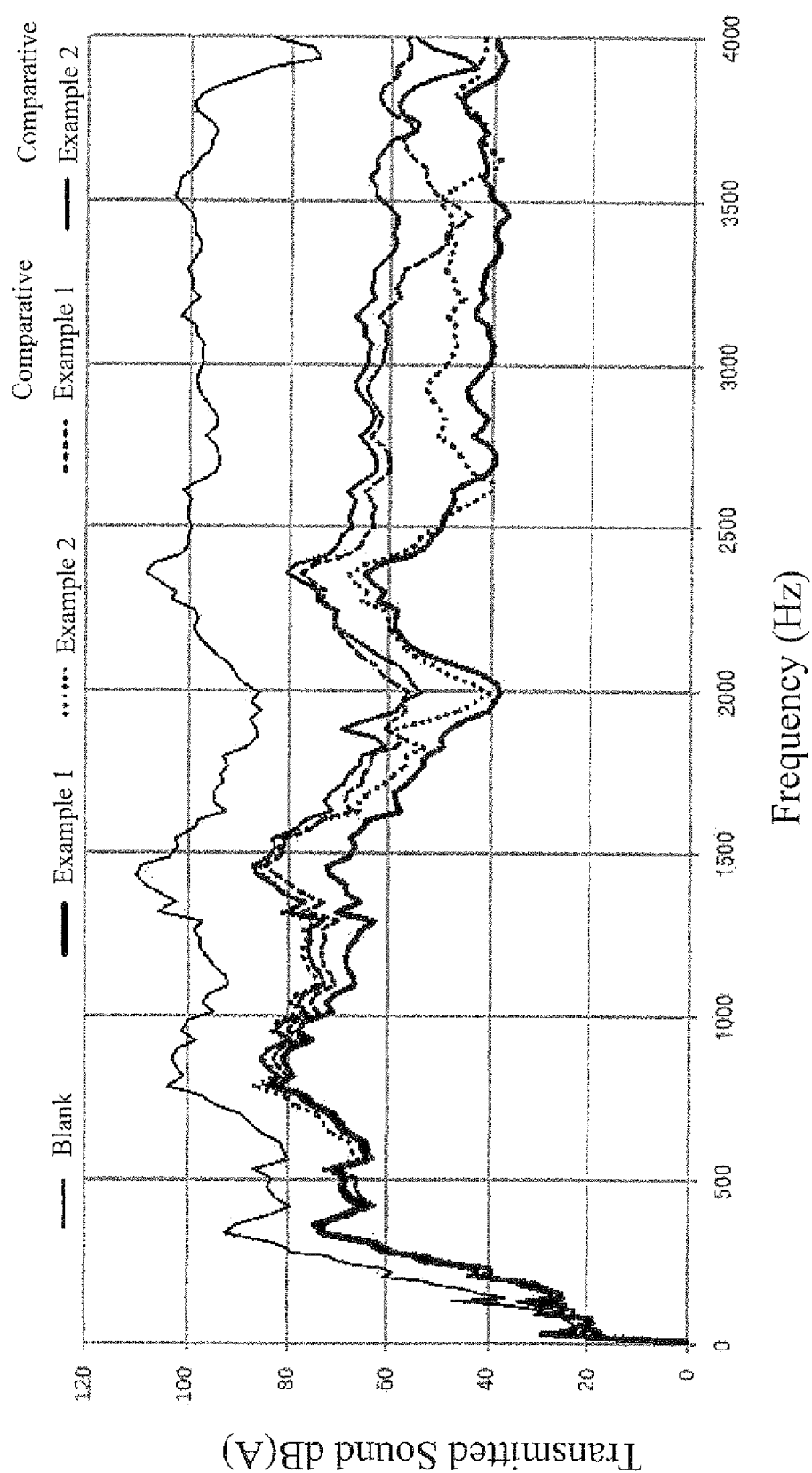
FIG. 6 is a graph showing the data of the transmitted sound measured with respect to the samples of Examples 1 to 2 and Comparative Examples 1 to 2.
Figure 7:
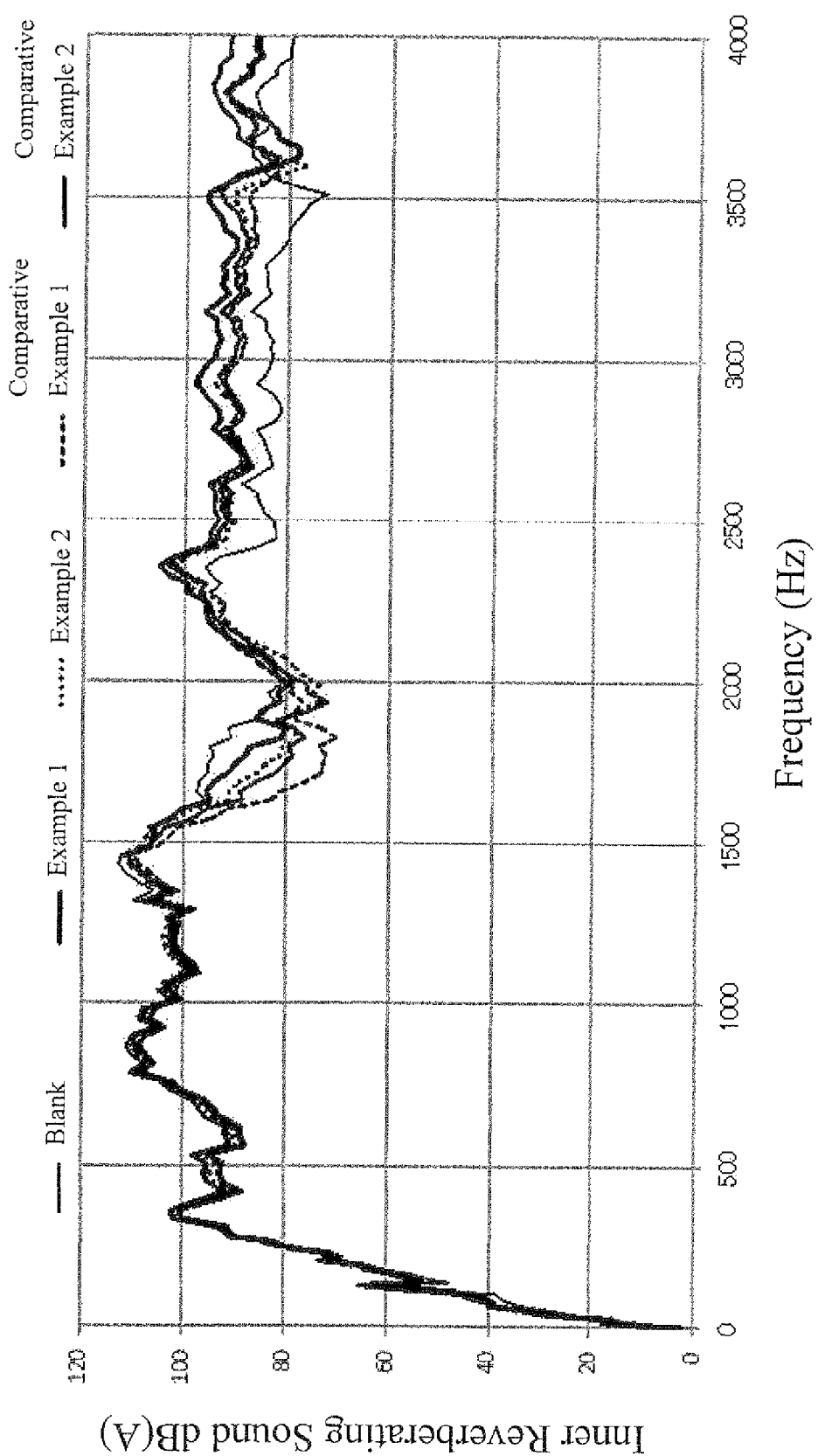
FIG. 7 is a graph showing the data of the inner reverberating sound measured with respect to the samples of Examples 1 to 2 and Comparative Examples 1 to 2.
Figure 8:
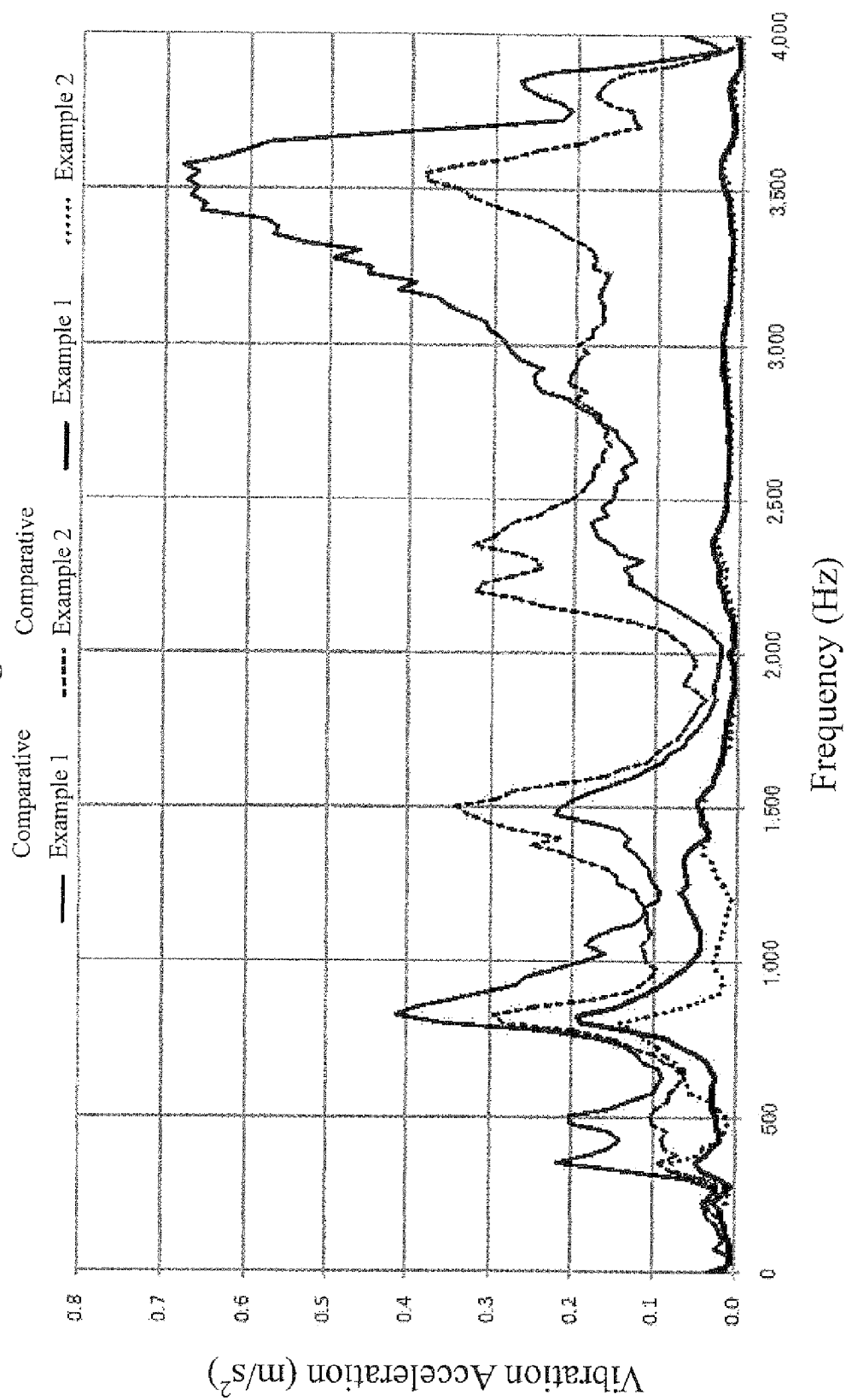
FIG. 8 is a graph showing the data of the vibration acceleration measured with respect to the samples of Examples 1 to 2 and Comparative Examples 1 to 2.

A sound source box having a speaker set therein in such a manner that it could emit a sound only in one direction from top opening thereof was disposed in a soundless room, and the soundproof cover was attached to the box so as to cover the opening. Under the condition, the transmitted sound, the inner reverberating sound, and the vibration acceleration on the surface of the rigid sound-insulating layer were measured (FFT). For comparison (blank), the sound from the top opening was directly measured. The results are shown in FIG. 6 to FIG. 8. As in these, the soundproof covers of Example 1 and Example 2 significantly reduced the transmitted sound and the transmitted vibration in the frequency region of about 1 kHz or more, giving no change in the inner reverberating sound. In this regard, the spacer layer is provided between the cover body as a rigid sound insulating layer and the soft sound-insulating layer and is made as a closed space by contacting the peripheral edge of the sound-absorbing material with the inner wall of the edge of the cover body. Since the sound wave (compression wave) that has been entered into the spacer layer by vibration transmission selectively oscillatory-deforms the soft sound-insulating layer that is easier to be deformed by pressure fluctuation than the cover layer by the effect of the air spring, the sound wave is consumed. As a result, entering of the sound wave into the cover layer (the rigid sound insulating layer) is suppressed.

TABLE 1

|  | Example 1 | Example 2 | Comparative Example 1 | Comparative Example 2 | Blank |
|---|---|---|---|---|---|
| Cover body | 6,6-nylon 3 mm | 6,6-nylon 3 mm | 6,6-nylon 3 mm | 6,6-nylon 3 mm | — |
| Spacer Layer | PET felt 10 mm (basis weight 500 g/m$^2$) | air layer 10 mm | — | — | — |
| Soft Sound-Insulating Layer | polymer-coated nonwoven fabric (basis weight 500 g/m$^2$) | polymer-coated nonwoven fabric (basis weight 500 g/m$^2$) | — | polymer-coated nonwoven fabric (basis weight 500 g/m$^2$) | — |
| Sound-Absorbing Material | PET felt 10 mm (basis weight 500 g/m$^2$) | PET felt 10 mm (basis weight 500 g/m$^2$) | PET felt 20 mm (basis weight 1000 g/m$^2$) | PET felt 20 mm (basis weight 1000 g/m$^2$) | — |

TABLE 1-continued

| | Example 1 | Example 2 | Comparative Example 1 | Comparative Example 2 | Blank |
|---|---|---|---|---|---|
| Transmitted Sound | | | FIG. 6 | | |
| Inner Reverberating Sound | | | FIG. 7 | | |
| Transmitted Vibration | | | FIG. 8 | | |

Example 3

A cover body of 6,6-nylon having a thickness of 3 mm, having a flexural strength of 113 MPa and having a curved peripheral edge as shown in FIG. 2 was prepared. A soft sound-insulating layer was prepared by coating a nonwoven fabric having a basis weight of 500 g/m² with a moisture-curable urethane resin (Nitta Gelatin's ARX-1272A®). Incidentally, as the nonwoven fabric, the same nonwoven fabric as used in Example 1 was used. Then, the soft sound-insulating layer was provided on one surface of a PET felt having a basis weight of 500 g/m² and a thickness of 10 mm, thereby preparing a sound-absorbing material. The cover body and the sound-absorbing material were integrated together, as spaced from each other via a gap of 10 mm therebetween, in such a manner that the soft sound-insulating layer could face the cover body; and the clearance between the peripheral edge of the sound-absorbing material and the cover body was sealed up with a sealing material having a thickness of 10 mm and was made from NBR, thereby constructing a soundproof cover as shown in FIG. 5.

Comparative Example 3

A cover body of 6,6-nylon having a thickness of 3 mm, having a flexural strength of 113 MPa and having a curved peripheral edge as shown in FIG. 2 was prepared. A soft sound-insulating layer was prepared by coating a nonwoven fabric having a basis weight of 500 g/m² with a moisture-curable urethane resin (Nitta Gelatin's ARX-1272A®). Incidentally, as the nonwoven fabric, the same nonwoven fabric as used in Example 1 was used. Then, the soft sound-insulating layer was provided on one surface of a PET felt having a basis weight of 500 g/m² and a thickness of 10 mm, thereby preparing a sound-absorbing material. The cover body and the sound-absorbing material were integrated together, as spaced from each other via a gap of 10 mm therebetween, in such a manner that the soft sound-insulating layer could face the cover body, thereby constructing a soundproof cover. Incidentally, the clearance between the peripheral edge of the sound-absorbing material and the cover body was not sealed up.

Evaluation of Soundproof Performance

Figure 9:
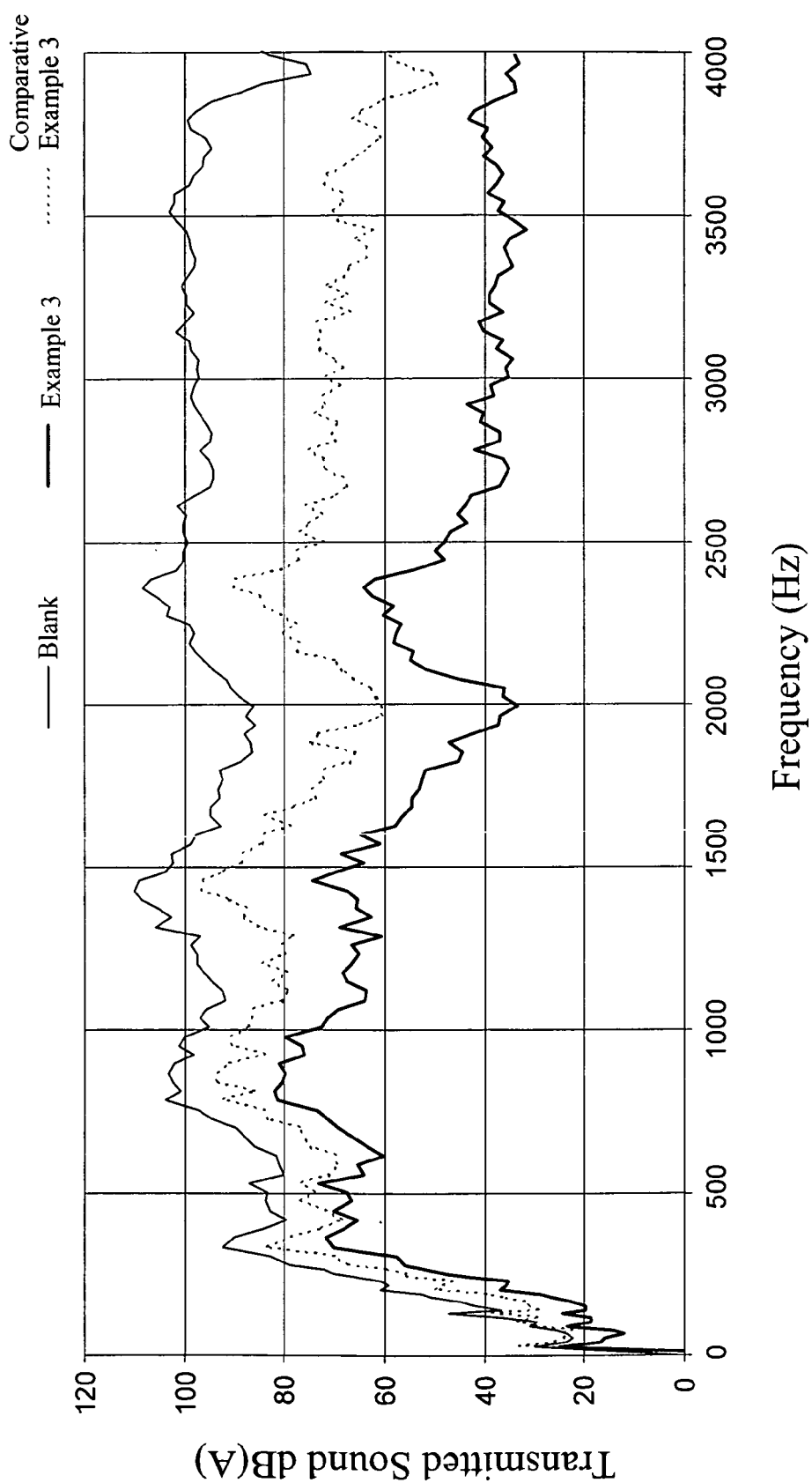
FIG. 9 is a graph showing the data of the transmitted sound measured with respect to the samples of Example 3 and Comparative Example 3.
Figure 10:
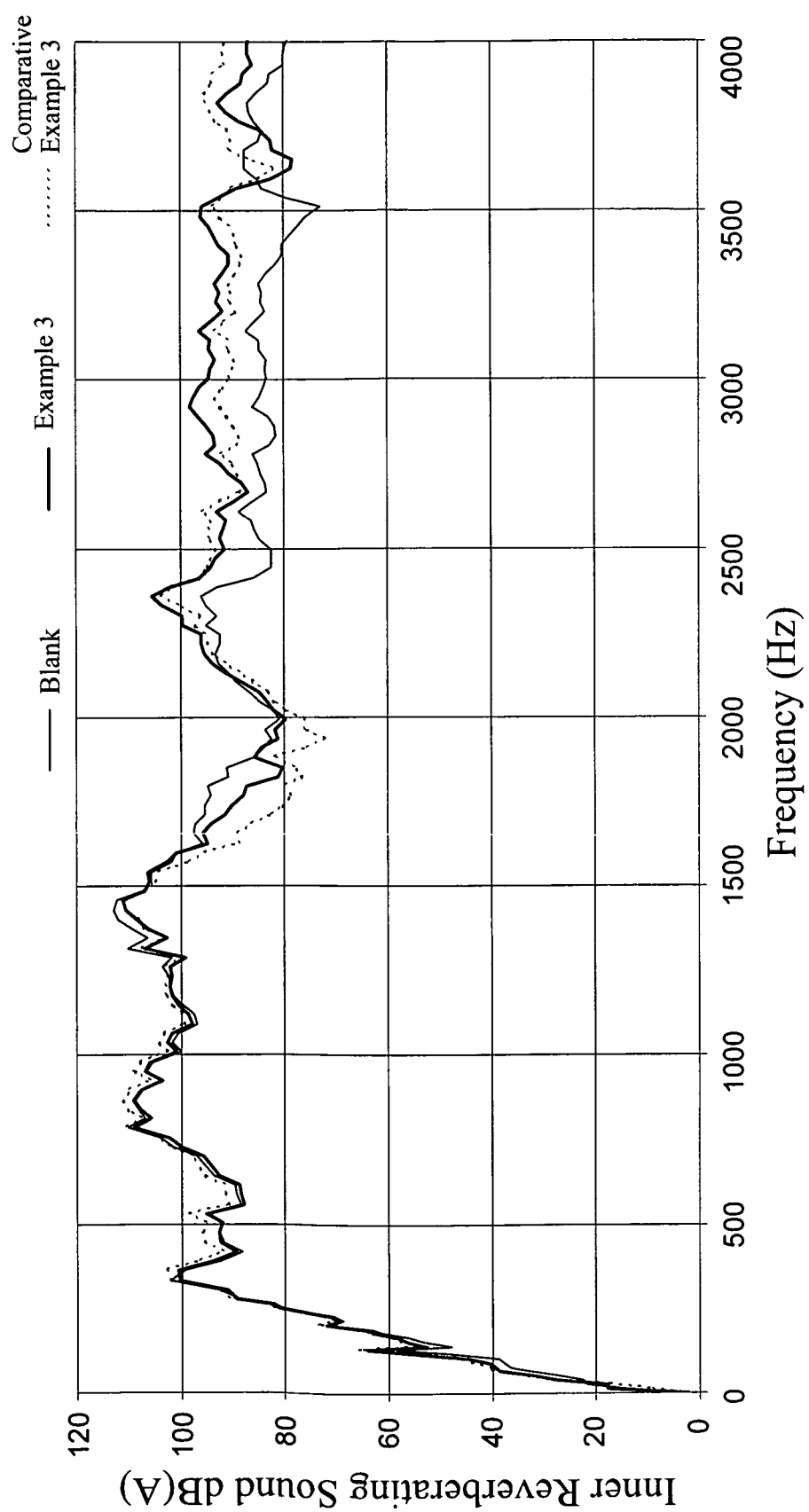
FIG. 10 is a graph showing the data of the inner reverberating sound measured with respect to the samples of Example 3 and Comparative Example 3.

A sound source box having a speaker set therein in such a manner that it could emit a sound only in one direction from top opening thereof, was disposed in a soundless room, and the soundproof cover was attached to the box so as to cover the opening. Under the condition, the transmitted sound, the inner reverberating sound, and the vibration acceleration on the surface of the rigid sound-insulating layer were measured (FFT). For comparison (blank), the sound from the top opening was directly measured. The results are shown in FIGS. 9 and 10. As in these, the soundproof covers of Example 3 significantly reduced the transmitted sound and in the frequency region of about 1 kHz or more, giving no change in the inner reverberating sound. In this regard, the spacer layer is provided between the cover body as a rigid sound insulating layer and the soft sound-insulating layer, and is made as a closed space by sealing up the clearance between the peripheral edge of the sound-absorbing material and the inner wall of the edge of the cover body with the sealing material. Since the sound wave (compression wave) that has been entered into the spacer layer by vibration transmission selectively oscillatory-deforms the soft sound-insulating layer that is easier to be deformed by pressure fluctuation than the cover layer, by the effect of the air spring, the sound wave is consumed. As a result, entering of the sound wave to the cover layer (the rigid sound insulating layer) is suppressed.

TABLE 2

| | Example 3 | Comparative Example 3 | Blank |
|---|---|---|---|
| Cover body | 6,6-nylon 3 mm | 6,6-nylon 3 mm | — |
| Spacer Layer | air layer 10 mm | air layer 10 mm | — |
| Soft Sound-Insulating Layer | polymer-coated nonwoven fabric (basis weight 500 g/m²) | polymer-coated nonwoven fabric (basis weight 500 g/m²) | — |
| Sound-Absorbing Material | PET felt 10 mm (basis weight 500 g/m²) | PET felt 10 mm (basis weight 500 g/m²) | — |
| Sealing Material | Exist | Not exist | — |
| Transmitted Sound | | FIG. 9 | |
| Inner Reverberating Sound | | FIG. 10 | |

The invention was detailed with reference specified embodiments. However, it is obvious to a person skilled in the art that the invention may be variously modified and corrected without deviating from the spirit of the invention.

This application is based on Japanese Patent Application No. 2008-205739 filed on Aug. 8, 2008 and Japanese Patent Application No. 2009-180656 filed on Aug. 3, 2009, and an entirety thereof is incorporated herein by reference.

Furthermore, all references cited here are incorporated by reference.

What is claimed is:

1. A soundproof cover for automobiles, said soundproof cover comprising:
   a cover body formed of a metal or a resin; and
   a sound-absorbing material disposed opposite to a sound source and secured to the cover body, wherein the sound-absorbing material has a soft sound-insulating layer on a surface side thereof between the sound-absorbing material and the cover body, portions of the sound-absorbing material are disposed apart from the cover body defining a gap between the sound-absorbing material and the cover body, and the sound-absorbing material has a peripheral edge that contacts with an inner wall of an edge of the cover body, the peripheral edge sealing the gap between the sound-absorbing material and the cover body.

2. The soundproof cover according to claim 1, wherein the gap between the cover body and the soft sound-insulating layer is filled with an air-permeable sound-absorbing material having a density of 100 kg/m$^3$ or less.

3. The soundproof cover according to claim 1, wherein the soft sound-insulating layer comprises a nonwoven fabric, a cloth, a laminate film, a rubber sheet, a resin film, a damping resin, a damping rubber or a laminate thereof.

4. The soundproof cover according to claim 3, wherein the soft sound-insulating layer comprises the nonwoven fabric or the cloth, coated with the damping resin.

5. A soundproof cover for automobiles, said soundproof cover comprising:

a cover body formed of a metal or a resin; and a sound-absorbing material disposed opposite to a sound source and secured to the cover body, wherein the sound-absorbing material has a soft sound-insulating layer on a surface side thereof between the sound-absorbing material and the cover body, portions of the sound-absorbing material are disposed apart from the cover body defining a gap between the sound-absorbing material and the cover body, and a clearance between a peripheral edge of the sound-absorbing material and an inner wall of an edge of the cover body is sealed up with a sealing material comprising an elastic material, the sealing material sealing the gap between the sound-absorbing material and the cover body.

6. The soundproof cover according to claim 5, wherein the gap between the cover body and the soft sound-insulating layer is filled with an air-permeable sound-absorbing material having a density of 100 kg/m$^3$ or less.

7. The soundproof cover according to claim 5, wherein the soft sound-insulating layer comprises a nonwoven fabric, a cloth, a laminate film, a rubber sheet, a resin film, a damping resin, a damping rubber or a laminate thereof.

8. The soundproof cover according to claim 7, wherein the soft sound-insulating layer comprises the nonwoven fabric or the cloth, coated with the damping resin.

9. A soundproof cover for automobiles, said soundproof cover comprising:

a cover body formed of a metal or a resin; and a sound-absorbing material disposed opposite to a sound source, the sound-absorbing material being secured to the cover body at connection points spaced across the cover body and being spaced from the cover body between the connection points defining respective gaps between the cover body and the sound-absorbing material, wherein the sound-absorbing material has a peripheral edge that contacts with an inner wall of an edge of the cover body, the peripheral edge sealing the gaps between the cover body and the sound-absorbing material.

* * * * *